United States Patent [19]

Shoemaker

[11] 3,893,188

[45] July 1, 1975

[54] MULTICHANNEL MAGNETIC HEAD UNIT

[76] Inventor: William M. Shoemaker, 56 Porterfield Pl., Freeport, N.Y. 11520

[22] Filed: June 5, 1974

[21] Appl. No.: 476,400

[52] U.S. Cl. ................ 360/121; 360/109; 360/129; 360/130

[51] Int. Cl. ....... G11b 5/28; G11b 5/50; G11b 5/56

[58] Field of Search .................... 360/121, 129–130, 360/126, 120, 119, 122, 125, 124, 109, 128, 104, 102–103

[56] References Cited

UNITED STATES PATENTS

| | | | |
|---|---|---|---|
| 2,706,752 | 4/1955 | Dupy | 360/120 |
| 2,769,866 | 11/1956 | Kornei | 360/129 |
| 2,880,280 | 3/1959 | Gernert et al. | 360/120 |
| 3,195,119 | 7/1965 | Worosz | 360/120 |
| 3,400,386 | 9/1968 | Sinnott | 360/129 |
| 3,710,039 | 1/1973 | McFadden | 360/130 |
| 3,751,599 | 8/1973 | Ogawa et al. | 360/121 |

*Primary Examiner*—Alfred R. Eddleman

[57] ABSTRACT

An eight-channel magnetic head unit is described which positions two four-channel recording-reproducing assemblies one behind the other in a single head nest. The four-channel assemblies are positioned such that their respective channel paths interleave across the path of the tape to enable octophonic utilization of the tape. The described magnetic head unit includes means for establishing a fixed guide path for the maganetic tape and for minimizing lateral movement thereof, and means enabling manual displacement of the tape from within the guide path when desired. Also described is an eight-channel magnetic head unit having a tape erase assembly.

14 Claims, 8 Drawing Figures

MULTICHANNEL MAGNETIC HEAD UNIT

FIELD OF THE INVENTION

This invention relates to multichannel magnetic head arrangements and more particularly to multichannel magnetic head arrangements capable of use with magnetic tape as the recording medium.

DESCRIPTION OF THE PRIOR ART

Various multichannel recording-reproducing assemblies have heretofore been known. For example, U.S. Pat. No. 3,460,244 dated Aug. 12, 1969 describes an eight-track read and write head for use with magnetic drum recorders or discs in which eight heads are transversely aligned in a row with their pole pieces extending through apertures in a sheet of spring-like material. Also, U.S. Pat. No. 3,701,858 dated Oct. 31, 1972 describes a multichannel magnet head unit for use with magnetic discs wherein a flying shoe held proximate to the disc contains a plurality of magnetic heads which are disposed side-by-side with their respective transducer coils disposed alternately to invert the magnetic circuits of adjacent heads. Further, U.S. Pat. No. 3,439,918 dated Apr. 22, 1969 describes a magnetic read and write head assembly for use with a magnetic tape wherein the heads are mounted on the periphery of a rotatable drum. U.S. Pat. No. 3,564,558 dated Feb. 16, 1971 describes a magnetic recording head assembly in which a plurality of stacked recording heads are aligned orthogonal to the longitudinal axis of a magnetic tape and each successive head is displaced along the longitudinal axis with respect to the adjacent heads. Also, U.S. Pat. No. 3,401,396 dated May 10, 1965 describes a head structure in which magnetic tape is moved past an erasing head and a longitudinally displaced recording head, and the recording head has two core portions each with spaced grooves accommodating multiturn recordings in a unitary structure. Further, U.S. Pat. No. 3,082,509 dated Mar. 26, 1963 describes a multichannel head assembly for use with magnetic tape wherein a unitary structure is provided in which the pole pieces partially overlap with respect to the axis of the tape. U.S. Pat. No. 2,927,974 dated Mar. 8, 1960 describes an eight-channel magnetic head unit adapted for use with ribbon-like magnetic tapes in which eight electromagnetic translating devices are individually arranged in two groups of four each, and in which the mounting assembly contains a notched portion to provide clearance for the tape. U.S. Pat. No. 2,732,275 dated Jan. 24, 1956 describes a seven-channel magnetic recording head for use with one-half inch wide tape in which the individual recording air gaps of the head are aligned across the tape. U.S. Pat. No. 3,426,336 dated Feb. 4, 1969 describes a magnetic head assembly in which the read-gaps and the write-gaps of the respective heads are aligned in the longitudinal direction of the tape, and read-gaps are also aligned in the transverse direction of the tape. Also, U.S. Pat. No. 3,390,451 dated July 2, 1968 describes a multi-track head in which the heads are cemented into slots of the head holder and aligned with respect to the transverse axis of the tape. Further, U.S. Pat. No. 2,912,516 dated Nov. 10, 1959 describes a magnetic head assembly as for a film projector wherein the gaps of the magnetic heads are transversely aligned and separate guide paths are provided for film of different widths.

As indicated above, various types of magnetic head devices have been known heretofore. One problem, however, with prior magnetic head devices is that they have not been adapted for eight-channel recording on conventional ¼ inch magnetic tape. For eight-channel utilization, the narrow width of such tape provides scant margin for tape wandering during recording or reproduction if the channels are not to be distorted by undesirable cross-effects.

Another problem with multichannel magnetic head devices is that such devices have generally not been adapted for convenient repair of malfunctions as by the use of modular components. A related problem with many prior multichannel magnetic recording-reproducing devices is the relative difficulty of initial assembly and alignment.

SUMMARY OF THE INVENTION

It is an object of the present invention to provide a multichannel magnetic head unit which may be used for multichannel recordings on relatively narrow magnetic tapes with a minimum of undesirable cross-effects between the recordings of adjacent channels.

It is another object of the present invention to provide an eight-channel magnetic head unit which may be used for octophonic recordings on conventional ¼ inch wide magnetic tape.

Another object of this invention is to provide a magnetic head unit which is compatible with both reel-to-reel and cartridge systems of magnetic tape sound reproduction.

A further object of this invention is to provide a multichannel magnetic head unit with tape guide means to reduce undesired interaction between channels.

A further object of this invention is to provide a multichannel magnetic head unit wherein the head assemblies are accessible for convenient initial assembly and for subsequent cleaning, adjustment and replacement.

Another object of this invention is to provide a magnetic head unit with modular head assemblies which may be conveniently and individually replaced in the event of a malfunction.

The multichannel magnetic head unit of this invention is a self-contained rigid structure which permits use of readily available head assemblies to achieve eight-channel utilization on standard ¼ inch wide magnetic recording tape. The head unit provides effective and consistent control over the travel of the tape across the head unit by means of guides on each side of each of the head assemblies. Further, once correctly positioned and locked in, the head assemblies will generally require no further adjustment until replacement is necessary.

A fixed guide path recessed from the periphery of the head unit is provided for the tape by leading, intermediate and trailing tape guide recesses in the head unit. These recesses restrict lateral tape movement during recording and playback modes and reduce the possibility of channel cross-talk due to a sideways wandering of the tape across the faces of the heads as from uneven tape tension in the tape transport mechanism or from skewing of unsupported tape.

Briefly, in a described embodiment of this invention, the multichannel magnetic head unit comprises a recording-reproducing head assembly for the odd-numbered channels (e.g., channels C1, C3, C5, C7) which has magnetic heads for each of such channels which are in spaced-apart side-by-side alignment; an identical recording-reproducing head assembly for the even-numbered channels (e.g., C2, C4, C6, C8) wherein the heads are aligned parallel to the axis of alignment of the heads for the odd-numbered channels and wherein the heads are further positioned so that their channels interleave across the tape path with the odd-numbered channels of the other head assembly; a head nest which contains both of the recording-reproducing head assemblies and also has tape guides formed therein for establishing a fixed tape path over and adjacent the faces of the two recording-reproducing head assemblies; shim or other means for accurately positioning the two head assemblies within the head nest; and set screw or other means for removably securing the two recording-reproducing assemblies within the head nest.

In a described embodiment of the invention the head nest has an interior cross-wall intermediate its ends which forms a pair of cavities in the head nest for receiving the two reproducing-recording head assemblies. The cross-wall of the head nest has a recess therein which provides an intermediate support and guide means for magnetic tape passing between the two recording-reproducing assemblies, and at the same time augments the magnetic isolation between the reproducing-recording assemblies which it separates. The mentioned recess in the cross-wall cooperates with aligned tape guide recesses in end walls of the head nest to guide and support the magnetic tape.

In an embodiment of the invention described herein, tape-lifting slots are provided in the head nest adjacent the tape path to facilitate manual removal of the magnetic tape from within the tape guide recesses when so desired.

Further, there is described herein an embodiment of the invention wherein a second cross-wall is provided in the head nest which forms a third cavity within the magnetic head unit. In this embodiment, the third cavity contains an all-channel tape erase assembly which extends across the tape path. The mentioned second cross-wall augments the magnetic isolation between the erase assembly and the adjacent recording-reproducing assembly and in addition is formed with a tape guide recess to restrain wandering and other undesirable tape movement as the tape passes between the erase head assembly and the adjacent recording-reproducing head assembly.

The objects and scope of this invention will become more apparent from the following detailed description and appended claims taken in conjunction with the accompanying drawings of embodiments of the invention.

DESCRIPTION OF PREFERRED EMBODIMENTS

Figure 1:
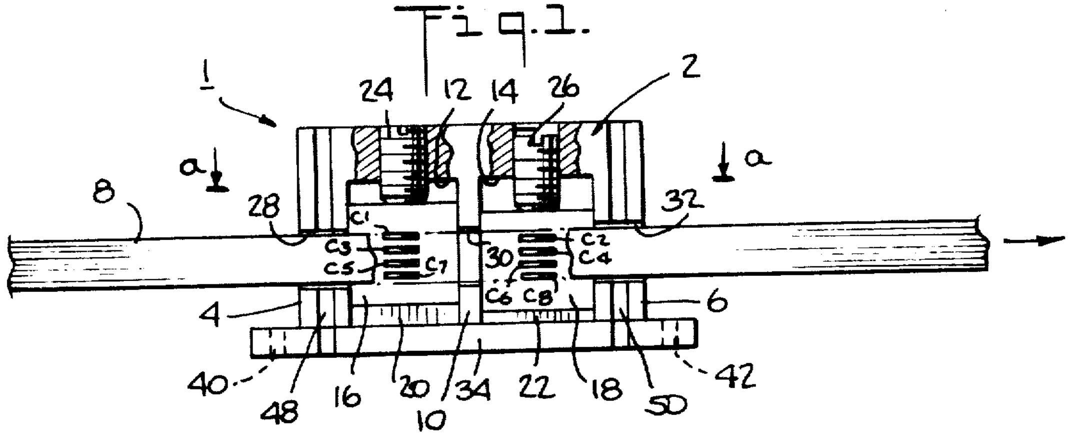
FIG. 1 illustrates a partially cross-sectional front view of an embodiment of a multichannel magnetic head unit according to this invention, in which magnetic tape is shown passing across the heads of two four-channel recording-reproducing head assemblies contained within cavities in a head nest.
Figure 2:
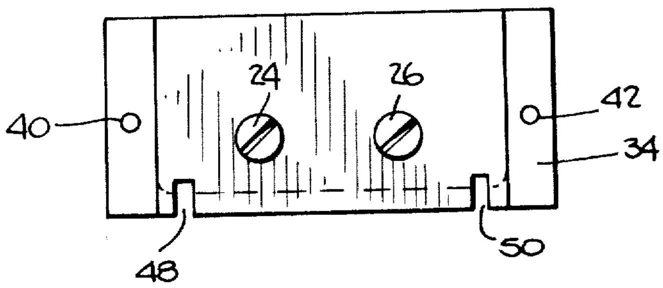
FIG. 2 illustrates a top plan view of the embodiment of FIG. 1.

Referring to FIG. 1, a multichannel magnetic head unit 1 is illustrated comprising a generally E-shaped tape nest 2 which may be milled from a bar of aluminum or other like rigid material. The head nest 2 has integral end walls 4, 6 at the leading and trailing ends of the nest relative to the illustrated direction of movement of magnetic tape 8, and the nest in the embodiment of FIG. 1 further includes an integral cross-wall 10 intermediate in position between the two end walls 4,6.

The end walls 4, 6 and cross-wall 10 of the tape nest form a pair of cavities 12, 14 within the head nest which are each dimensioned to receive a four-channel recording-reproducing head assembly 16, 18. The cavities 12, 14 have parallel leading and trailing sides relative to the illustrated direction of movement of the magnetic tape 8, and these sides are spaced apart so to provide a cavity length providing a snug fit for the recording-reproducing head assembly 16, 18 contained within the respective cavity 12, 14. At the same time, each cavity 12, 14 has a width which permits sideways displacement of the recording-reproducing head assembly 16, 18 therein relative to the longitudinal axis of the magnetic tape passing over the head nest 2. The cavities 12, 14 extend through the rear surface of the head nest 2 so that electrical terminals on the head assemblies are exposed to permit ready wiring connection thereto in a known manner to an amplifier or other electrical circuit.

The pair of head assemblies 16, 18 are positioned relative to the axis of the tape path by means of shims 20, 22 contained within the cavities 12, 14. The shims 20, 22 used to position the head assemblies are selected to be of a thickness such that, when the shims are in place in the cavities, the channels of each of the four-channel head assemblies 16, 18 are all within the tape path, and the longitudinal axes of such channels are interleaved as illustrated in FIG. 1. Thus, designating as odd-numbered channels (e.g., C1, C3, C5, C7) the various channels of electromagnetic head assembly 16, and designating as even-numbered channels (e.g., C2, C4, C6, C8) the various channels of electromagnetic head assembly 18, the two head assemblies 16, 18 are positioned by their respective positioning shims 20, 22 such that the channels interleave across the width of the tape path in normal arithmetic sequence, i.e., Channel C1, Channel C2, Channel C3, Channel C4, and so forth.

The electromagnetic head assemblies 16, 18 are locked in position within the head nest 2 by set screws 24, 26 which are threadably secured to the head nest and which engage a wall of their respective head assembly 12, 14 to press the head assembly against its respective positioning shim 20, 22.

Figure 3:
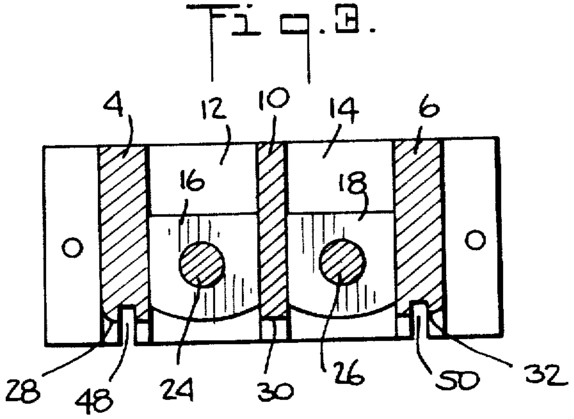
FIG. 3 illustrates a cross-sectional view along line a—a of FIG. 1.
Figure 4:
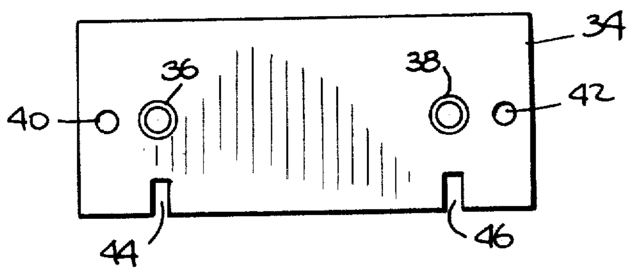
FIG. 4 illustrates a plan view of the base plate of the embodiment of FIG. 1.
Figure 5:
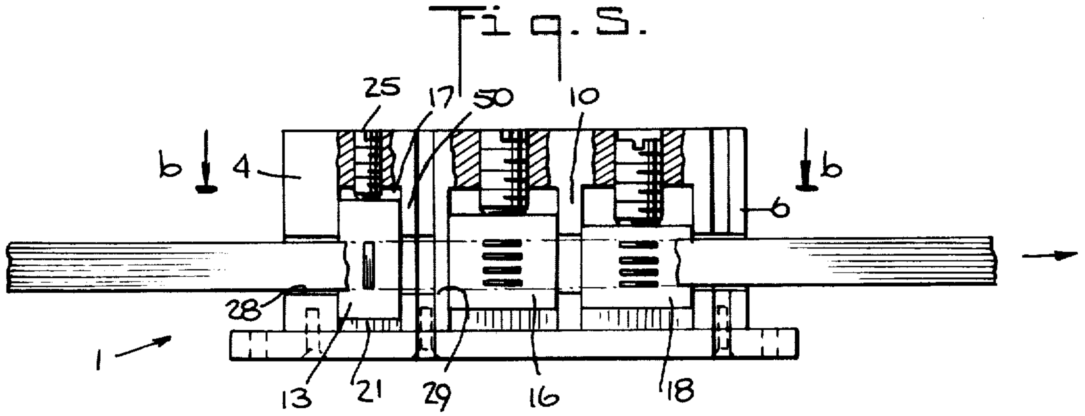
FIG. 5 illustrates a partially cross-sectional front view of a second embodiment of a multichannel magnetic head unit according to this invention in which an all-channel tape erase head is provided.
Figure 6:
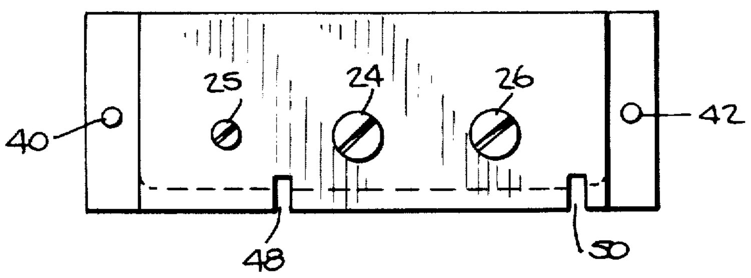
FIG. 6 illustrates a top plan view of the embodiment of FIG. 5.
Figure 7:
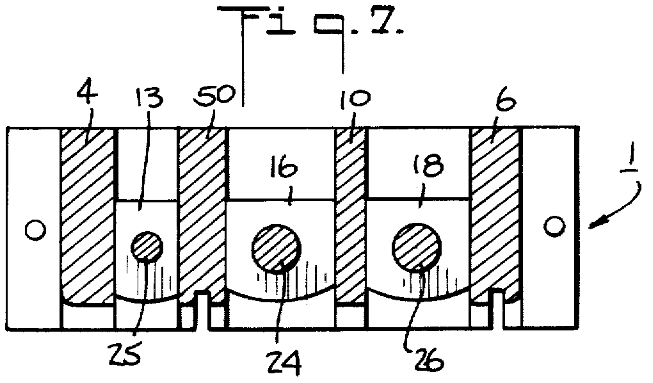
FIG. 7 illustrates a cross-sectional view along line b—b of FIG. 5.
Figure 8:
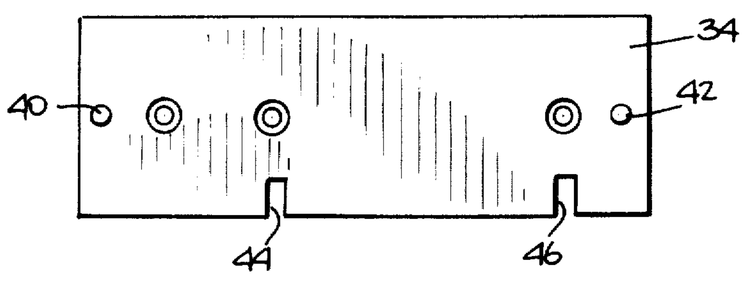
FIG. 8 illustrates a plan view of the base plate of the embodiment of FIG. 5.

Referring to FIGS. 1 and 3, the leading and trailing end walls of the head nest 2 as well as the intermediate cross-wall 10 each have tape guide recesses 28, 30, 32 formed therein which are of a depth to contain the magnetic tape 8, and which are at the same time of a width which is of the order of only 0.002 inches wider than the width of the tape 8. This close fit serves to restrain lateral movement of the tape as it passes through the head unit 1, and the multiple guide recesses 28, 30, 32 serve to minimize the length of unsupported and unrestrained portions of the tape. The recesses 28, 30, 32 are aligned with one another to provide a tape path through the magnetic head unit 1. Further, as shown in FIG. 1, the recesses 28, 32 in the end walls of the head nest 2 have beveled edges adjacent the outer periphery of the head nest for tape easement and to reduce tape wear as the tape enters and leaves the magnetic head unit.

The head unit 1 illustrated in FIGS. 1–4 further includes a base plate 34 of a rigid material such as aluminum which supports the positioning shims 20, 22. The base plate has a pair of countersunk clearance holes 36, 38 for screws which threadably secure the base plate 34 to the body of the head nest 2. This base plate also has clearance holes 40, 42 for receiving screws for threadably securing the magnetic head unit 1 of this invention to a tape deck or other conventional recording-reproducing apparatus (not shown) such that the tape path of the head unit 1 is in alignment with the tape path of said recording-reproducing apparatus.

Tape-lifting slots 44, 46 are provided in the base plate which are in alignment with similar slots 48, 50 in the head nest to facilitate manual lifting of the tape 8 from within the tape guide recesses 28, 30, 32 when desired, such as for cleaning of the head unit 1.

In assembling the multichannel head unit 1 illustrated in FIGS. 1–4, the two outside channels of the apparatus (i.e., channel C1 of electromagnetic head assembly 16 and channel C8 of head assembly 18) are each electrically connected to a separate monitoring amplifier (not shown) which has a peak-reading VU meter. The recording-reproducing head assemblies 16, 18 are then inserted into their respective cavities 12, 14 in an empty head nest 2 which is secured in position relating to a suitable tape transport to receive a pre-recorded magnetic tape 8 through the guide recesses 28, 30, 32 of the head nest 2. Each head assembly 16, 18 is then in turn shimmed up by insertion of channel positioning shims 20, 22 in the head assembly's respective cavity 12, 14 until a maximum reading is obtained on the VU meter electrically connected to said head assembly 16, 18. This procedure requires insertion of shims of varying thickness until the maximum reading is obtained. When maximum readings are obtained on the two VU meters, the two head assemblies 16, 18 are then moved forward and back in their cavities until identical readings are obtained on the two VU meters. The head assemblies 16, 18 are then secured in position within the head nest 2 by a tightening of set screws 24, 26.

FIGS. 5–8 illustrate a second embodiment of a multichannel head unit according to this invention. Members in this second embodiment which correspond to like members in the embodiment of FIGS. 1–4 are designated by the same reference numerals.

In the embodiment of FIGS. 5–8, a second cross-wall 50 provides a third cavity 17 in the head nest 2 for the close-fit reception therein of an all-channel erase head assembly 13. The erase head assembly 13 is adjustably positioned relative to the longitudinal axis of the tape path by means of a head-positioning shim 21 within the cavity 17, and the erase head assembly is aligned with the recording-reproducing head assemblies 12, 14 in the path of the magnetic tape 8. Once it is aligned, the erase head assembly is pressed against the head-positioning shim 21 and secured in position by means of a set screw 25 which threadably engages a wall of the rigid head nest 2. Cavity 17 may extend through the rear wall of the head nest so as to expose electrical terminals on the rear of the erase assembly and permit their connection in a known manner to an oscillator or other electrical circuit.

In this embodiment the walls 4, 50 of the head nest 2 which are alongside the erase head assembly 13 are provided with tape guide recesses 28, 29 to support and provide a fixed path for the tape 8. Further, to augment the magnetic isolation of the erase head assembly 13, the thickness of the second cross-wall 50 is of increased dimension relative to the thickness of the cross-wall separating the recording-reproducing head assemblies 12, 14.

More generally, in this embodiment the multichannel magnetic head unit 1 comprises a nest 2 for side-by-side mounting of two four-channel recording/playback magnetic head assemblies 12, 14 and a full-channel erase head assembly 13 for use with a tape recorder or other instrument. With the head unit, eight channels can be obtained on a single ¼ inch wide magnetic tape 8 with a very close separation between adjacent channels. The three head assemblies 12, 13, 14 are mounted side-by-side in the head nest 2 such that, in operation, the four channels provided by one recording-reproducing head assembly 12 are interleaved with the four channels provided by the other recording-reproducing head assembly.

The three head assemblies 12, 13, 14 are locked in position so that they do not shift within the rigid head nest 2 by means of set screws 24, 25, 26 on one side of the head assemblies which cooperate with shims 20, 21, 22 on the other side (which position the heads laterally).

A fixed and controlled guide path is provided for the magnetic tape 8 passing over the head assemblies 12, 13, 14 by means of recesses 28, 29, 30, 32 in the face of the head nest. This fixed path deters wandering of the tape as it passes over the heads and thereby avoids sound distortions such wanderings would cause. Intermediate support is provided for the magnetic tape 8 through tape guide recesses 29, 30 in the intermediate cross-walls of the head nest, and said cross-walls in addition augment the magnetic isolation between the magnetic assemblies on either side thereof.

It is noted that the problem of tape wandering referred to herein may not be objectionable with good quality tape transports in monaural, or two-channel, or four-channel sound systems because of the wider latitude in such systems with respect to clearances between adjacent channels on the tape. Tape wandering is, however, a significant problem for recording eight-channel sound systems on narrow tapes, as even the slightest deviation can cause a track to move from its assigned channel to an adjacent channel because of the miniscule separation between channels. The fixed tape guide path provided by the multichannel head unit of this invention alleviates the possibility of wandering even for tapes with pronounced skewing tendencies as the tape remains unsupported for only a fraction of an inch at any given point within the head unit.

It is contemplated that the four-channel recording-reproducing head assemblies 12, 14 and the all-channel erase head assembly 13 employed in the described embodiments of the invention may each be conventional commercially-available assemblies. For example, they may respectively be the "Nortronics 5830 Series Four-Channel R/P Head" and the "Nortronics 4400 Series Full-Track Erase Head." Accordingly, a multichannel magnetic head unit may be provided according to this invention which does not require any custom designed head assemblies, and for which repair and replacement is readily available through present trade facilities. Further, such head assemblies are generally pre-aligned prior to sale and, accordingly, only have to be aligned with respect to each other upon assembly or repair of a multichannel head unit as described herein. Further, if only one of the modular head assemblies malfunctions, only such module need be replaced rather than the entire head unit.

What is claimed is:

1. A multichannel magnetic head unit for use with magnetic tape, comprising a pair of recording-reproducing head assemblies with a plurality of magnetic heads and at least three recording-reproducing channels;

one of said head assemblies being positioned behind the other head assembly such that the axes of its recording-reproducing channels longitudinally alternate with the axes of the channels of said other head assembly;

a head nest which contains both said head assemblies and has a cross-wall between said head assemblies and an end wall on an opposite side of at least said one head assembly; and said cross-wall and said end wall each having aligned guide means for receiving and guiding the magnetic tape.

2. A multichannel magnetic head unit as set forth in claim 1 wherein said head nest has a second cross-wall, and wherein an erase head assembly is contained within said head nest and adjacent said second cross-wall.

3. A multichannel magnetic head unit as set forth in claim 1 wherein the plurality of magnetic heads in said one head assembly are in spaced-apart side-by-side alignment along an axis which is perpendicular to the path of the magnetic tape, and the plurality of magnetic heads in said other head assembly are in spaced-apart side-by-side alignment along an axis which is parallel to the axis of alignment of the magnetic heads in said one head assembly.

4. A multichannel magnetic head unit as set forth in claim 1 wherein each said head assembly is contained within a separate cavity in said head nest, and each such cavity has a dimension bounded by said cross-wall and by an end-wall of said head nest on the opposite side of the respective head assembly.

5. A multichannel magnetic head unit as set forth in claim 4 wherein each said end-wall has guide means for receiving and guiding the magnetic tape in a path which is aligned with the recording-reproducing channels of said pair of head assemblies.

6. A multichannel magnetic head unit as set forth in claim 5 wherein said guide means in said end-walls and said guide means in said cross-wall each comprise a recess in the respective walls of the head nest.

7. A multichannel magnetic head unit as set forth in claim 5 wherein said head nest has a side wall extending between said end walls, and said side wall has at least one slot therein for manually displacing the magnetic tape from said guide means.

8. A multichannel magnetic head unit as set forth in claim 1 which further comprises means secured to said head nest for separately and removably locking each said head assembly in position in said head nest.

9. A multichannel magnetic head unit as set forth in claim 1 which further comprises positioning means contacting at least one of said head assemblies for adjustably varying the position of the head assembly within said head nest.

10. A multichannel magnetic head unit as set forth in claim 9 wherein said positioning means comprises a removable shim contacting a head assembly.

11. A multichannel magnetic head unit as set forth in claim 10 wherein said positioning means comprises a pair of removable shims, each of which contacts a different head assembly.

12. A multichannel magnetic head unit for use with magnetic tape, comprising a rigid head nest having a pair of end walls, at least one cross-wall therebetween, and a pair of cavities bounded on one side by the cross-wall and on the opposite side by a different end wall;

a pair of four channel recording-reproducing head assemblies, each of which is in a different one of the cavities in said head nest and is so positioned therein that the axes of the four channels of one of said head assemblies longitudinally alternate with the axes of the four channels of the other head assembly;

said head nest being further characterized by tape guide recesses in said end walls and cross-wall which are aligned with one another and with the channels of said pair of recording-reproducing assemblies so as to provide a fixed path for the magnetic tape;

positioning means contacting said one head assembly for adjustably varying the position of the said one assembly within said head nest; and means contacting said head nest for removably securing said one head assembly in position in the head nest.

13. A multichannel magnetic head unit for use with magnetic tape, comprising a rigid head nest having a pair of spaced-apart cross-walls which are between and parallel to a pair of opposing end walls of said head nest, thereby defining three cavities within said head nest which are at least substantially aligned along the path for the magnetic tape;

an erase head assembly within one of the three cavities of said head nest;

a pair of multichannel recording-reproducing head assemblies, each of which is within a different one of the three cavities of said head nest;

positioning means contacting at least one of said multichannel recording-reproducing head assemblies for staggering the channels of said one recording-reproducing head assembly with respect to the channels of the other recording-reproducing head assembly along the axis of the tape path; and means contacting said head nest for removably securing at least said one head assembly in position in the head nest.

14. A multichannel magnetic head unit as set forth in claim 13, wherein each of the cross-walls and the end walls of said head nest which are parallel thereto have integral guide means for maintaining magnetic tape on a fixed path over the said head assemblies.

* * * * *